(12) United States Patent
Baiye

(10) Patent No.: US 7,660,757 B2
(45) Date of Patent: Feb. 9, 2010

(54) METHOD AND SYSTEM FOR PROVIDING A FIXED RATE ANNUITY WITH A LOCK-IN INTEREST RATE FEATURE

(75) Inventor: Simpa Baiye, Simsbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 52 days.

(21) Appl. No.: 11/787,493

(22) Filed: Apr. 16, 2007

(65) Prior Publication Data

US 2008/0256000 A1    Oct. 16, 2008

(51) Int. Cl.
*G06Q 40/00* (2006.01)
(52) U.S. Cl. .................. 705/35; 705/36 R
(58) Field of Classification Search .......... 705/35, 705/36 R, 36 T, 38, 39, 40, 4
See application file for complete search history.

(56) References Cited

U.S. PATENT DOCUMENTS

| 5,754,980 | A | 5/1998 | Anderson |
| 5,878,405 | A | 3/1999 | Grant |
| 5,893,071 | A | 4/1999 | Cooperstien |
| 5,913,198 | A | 6/1999 | Banks |
| 5,926,800 | A | 7/1999 | Baronowski |
| 5,933,815 | A | 8/1999 | Golden |
| 6,275,807 | B1 * | 8/2001 | Schirripa .................. 705/36 R |
| 6,611,808 | B1 | 8/2003 | Preti et al. |
| 6,611,815 | B1 | 8/2003 | Lewis |
| 6,636,834 | B1 * | 10/2003 | Schirripa .................. 705/36 R |
| 6,661,815 | B1 | 12/2003 | Kozlovsky |
| 6,950,805 | B2 | 9/2005 | Kavanaugh |
| 6,963,852 | B2 | 11/2005 | Koresko |
| 7,016,871 | B1 | 3/2006 | Fisher |
| 7,080,032 | B2 * | 7/2006 | Abbs et al. .................... 705/35 |
| 7,089,201 | B1 | 8/2006 | Dellinger |
| 7,113,913 | B1 | 9/2006 | Davis |
| 7,376,608 | B1 * | 5/2008 | Dellinger et al. .......... 705/36 R |
| 7,398,241 | B2 * | 7/2008 | Fay et al. ................... 705/36 R |
| 2001/0014873 | A1 | 8/2001 | Henderson |
| 2001/0047325 | A1 | 11/2001 | Livingston |
| 2002/0035527 | A1 | 3/2002 | Corrin |
| 2002/0174045 | A1 | 11/2002 | Arena |
| 2002/0188540 | A1 * | 12/2002 | Fay et al. ....................... 705/36 |
| 2003/0088430 | A1 | 5/2003 | Ruark |
| 2003/0105652 | A1 | 6/2003 | Arena |

(Continued)

OTHER PUBLICATIONS

Shapiro et al. "Separating Annuity Buyers by Fixed vs. Variable" Apr. 5, 1993, National Underwriter (Life.Health.Financial Serviecs), V97N14 pp. 20-21.*

(Continued)

*Primary Examiner*—Kelly Campen
(74) *Attorney, Agent, or Firm*—Howard IP Law Group, PC

(57) ABSTRACT

A data processing method and system administers a deferred annuity product during the accumulation phase of a contract term. The annuity product permits the client to select both an interest rate which is reset periodically (reset rate) and an interest rate which is guaranteed for multiple years (MYG rate), during the same contract term. The client may elect to automatically switch from the reset rate to the MYG rate, for the remainder of the contract term, when the reset rate falls below the MYG rate.

5 Claims, 2 Drawing Sheets

U.S. PATENT DOCUMENTS

| | | | |
|---|---|---|---|
| 2003/0120570 | A1 | 6/2003 | Dellinger |
| 2003/0171956 | A1 | 9/2003 | Cox |
| 2003/0187764 | A1 | 10/2003 | Abba |
| 2004/0039601 | A1 | 2/2004 | Anderson |
| 2004/0088236 | A1 | 5/2004 | Manning |
| 2004/0204951 | A1 | 10/2004 | Wood |
| 2004/0267647 | A1 | 12/2004 | Brisbois |
| 2005/0010453 | A1 | 1/2005 | Terlizzi |
| 2005/0060251 | A1 | 3/2005 | Schwartz |
| 2005/0240521 | A1* | 10/2005 | Fuentes-Torres ............. 705/39 |
| 2006/0080148 | A1 | 4/2006 | Koresko |
| 2006/0089892 | A1 | 4/2006 | Sullivan |
| 2006/0095353 | A1 | 5/2006 | Midlan |
| 2006/0111997 | A1* | 5/2006 | Abbott et al. ................. 705/35 |
| 2006/0111998 | A1 | 5/2006 | Fisher |
| 2006/0143055 | A1 | 6/2006 | Loy |
| 2006/0149651 | A1 | 7/2006 | Robinson |
| 2006/0155622 | A1 | 7/2006 | Laux |
| 2006/0195375 | A1 | 8/2006 | Bohn |
| 2006/0206398 | A1 | 9/2006 | Coughlin |
| 2006/0206401 | A1 | 9/2006 | Abbs |
| 2006/0212379 | A1 | 9/2006 | Perg |
| 2006/0212380 | A1 | 9/2006 | Williams |
| 2007/0011063 | A1 | 1/2007 | Shelon |
| 2007/0011069 | A1 | 1/2007 | Bevacqua |
| 2007/0011086 | A1 | 1/2007 | Dellinger |
| 2007/0078690 | A1 | 4/2007 | Kohl |
| 2007/0100715 | A1 | 5/2007 | O'Donnell |
| 2007/0100720 | A1 | 5/2007 | Bonvouloir |
| 2007/0100726 | A1 | 5/2007 | O'Flinn |
| 2007/0100727 | A1 | 5/2007 | Multer |
| 2007/0106589 | A1 | 5/2007 | Schirripa |
| 2007/0162380 | A1 | 7/2007 | Conroy |
| 2007/0198377 | A1 | 8/2007 | Livingston |

OTHER PUBLICATIONS

Anonymous "Q2 2005 American Eqty Invt Life Hld Co Earnings Conference Call-Final" Aug. 4, 2005, Fair Disclosure Wire.*

"Income Select for Life" (Transamerica Capital Financial Life Insurance Company), https://www.transamericaadvisor.cony/contentServer/MediaServer? uri=/site/tciidex/media/PDF/Annuities_TCI/Client _Approved_Material/Tips_and_Techniques/.BRIS.pdf.

"Jackson Enhances Living Benefit Options within its Perspective Family of Variable Annuities" (Business Wire Apr. 30, 2007), http://findarticles.com/p/articles/mi_m0EIN/is_2007_April_30/ai_n19041944.

"Glossary of Insurance Terms" (Life Office Management Association, Inc. 2002), http://www.iii.org/media/glossary/.

"Lifetime Legacy" http://www.americo.com/lifetime/lifetimelegacy.html.

"Accelerated Death Benefits" (Jan. 22, 2007) http://www.medicare.gov/LongTermCare/Static/AccDeathBenefits.asp?dest=NAV%7CPaying%7CPrivateInsurance%7CAccDeathBenefits.

"Alternatives to Long Term Care Insurance" (SWP Advocates 2004), http://www.senior-wealth-protection-advocates.com/long-term-care-insurance-alternatives.html.

Form 485BPOS, (Apr. 26, 2006), Transamerica-NewLTC-LifetimeGMWB_May2006SECFiling.pdf.

Form N-4, (Feb. 22, 2006), Transamerica-NewLTC-LifetimeGMWB_SECFiling.pdf.

"Fidelity.com Glossary" https://scs.fidelity.com/webxpress/help/topics/help_definition_p.shtml.

"Dynamic Retirement Withdrawal Planning" R.Gene Stout and John B. Mitchell, (Financial Services Review 2006), http://www.rmi.gsu.edu/FSR/abstracts/Vol_15/zux00206000117.pdf.

"Retireonyourterms" http://www.retireonyourterms.com/ glossary/GlossaryText.htm.

"Prudential Investments Introduces Strategic Partners Annuity One: New Variable Annuity Offers Investors World-Class Money Managers and Flexible Product Features" (Business Wire Oct. 9, 2000), http://findarticles.com/p/articles/mi_m0EIN/is_2000_Oct_9/ai_65846822.

"The Power and Protection of Income Annuities" (Empire Fidelity Investments Life Insurance Company), http://personal.fidelity.com/products/annuities/pdf/IncomeAnnuitySpecialReport.pdf.

"Making IRAs Last a Lifetime with Annuities" (Life Health Advisor, Mar. 2006), http://www.fpamd.org/documents/MakingIRAsLastaLifetimewithAnnuities.pdf.

Prospectus, Penn Mutual Variable Annuity Account III, (Penn Mutual May 1, 2007), PennMutual-LifetimeGMWB-CPI_SECFiling.pdf.

Form 497, (Oct. 2, 2006), Penn-EnhancedCreditVA_May2001_Prospectus.pdf.

"RiverSource Innovations Select Variable Annuity" (River Source Life Insurance Company 2007), http://www.riversource.com/rvsc/global/docs/INNOV-SELECT-NY-AAG.pdf.

"Key to Making Retirement Savings Last: The Withdrawal Rate" (New York Life Insurance Company 2007), http://www.newyorklife.com/msm/cda/main/display/popup/print_this/1,3256.14198.00.html?&site_id=I&docLocation=http://www.newyorklife.com/cda/0.3254.14198.00.html.

"Pacific One Select Investor Guide", (Nov. 2007), http://www.mutualfunds.pacificlife.com/public/mutual_funds/product_info/individual_k/pdfs/d5026.pdf.

"Just the Facts" (Nationwide Financial Services, Inc. 2006-2007) https://ssc.nwservicecenter.com/media/pdf/product/VAM-0504AO-F1.pdf.

* cited by examiner

METHOD AND SYSTEM FOR PROVIDING A FIXED RATE ANNUITY WITH A LOCK-IN INTEREST RATE FEATURE

BACKGROUND OF THE INVENTION

1. Field of the Invention

The present invention relates to a method and system for providing a client with the benefit of a fixed rate annuity, offering both a static, guaranteed rate for a multi-year period, as well as a rate which fluctuates periodically (reset rate); more particularly, to a method and system wherein a client initially selects the reset rate while retaining a one-time option, exercised manually or automatically, to switch to, or lock in, the guaranteed interest rate for the remainder of the contract term, when the reset rate falls below the guaranteed rate.

2. Description of the Prior Art

A deferred annuity is typically used to provide accumulation and, potentially, a future stream of annuity income. The deferred annuity comprises an accumulation period during which the account value will vary with the underlying investments. Deferred annuities typically provide guaranteed income for life which transfers some portion or all of the risk of outliving one's accumulated assets to the insurer.

One basis for distinguishing commonly available deferred annuities is whether the annuity is classified as a "fixed annuity" or a "variable annuity." In a fixed annuity, the insurer guarantees a fixed rate of interest applicable to each annuity deposit. Therefore, a fixed annuity is desirable for those seeking a "safe" investment. The guaranteed interest rate may apply for a specified period of time, often one year or more. Often, a rate guaranteed for more than one year is called a "multi-year guarantee" (MYG rate). The rate credited on a fixed annuity is reset periodically, moving in an amount and a direction that correlates with the yields available on fixed-income investments available to the insurer. The rate may also be adjusted based upon an external index. For a given term, fixed annuities typically only offer clients the fore-mentioned guaranteed rate of interest for multi-years (MYG rate) or alternatively, an initial rate that can be reset periodically (typically annually). The MYG rate is often lower than the reset rate because the insurer has less flexibility. A client must select only one of these options during a contract term.

Thus, typically, a client seeking a high rate of return, who selects a fixed annuity, elects to receive rates that can be reset periodically, and faces the risk that the issuing company may significantly lower rates at the end of each 1 period within the life of the contract. This exposure to risk reduces the attractiveness of the annuity as an investment. Potential clients who require a certain level of income in retirement, and will be depending upon the annuity to supply that income, may seek other investments, outside of the annuity market, without that potential exposure.

Thus, there remains a need in the art for a data processing method, for administering an annuity product for a contract term, wherein the annuity product has a lock-in feature that provides a guarantee that the interest payable will not fall below a guaranteed interest rate, should adjustable rates be significantly reset downwards.

In addition, there is needed an annuity product wherein a guaranteed interest rate is automatically applied to the account balance of the annuity, when an adjustable interest rate payable falls below the guaranteed interest rate, so that the client need not concern himself or herself with the fluctuations in the adjustable rate.

SUMMARY OF THE INVENTION

The present invention provides a data processing method and system for administering a deferred annuity product during the accumulation phase of a contract term, wherein the annuity product permits the client to select both an interest rate which is reset periodically (reset rate) and an interest rate guaranteed for multiple years (MYG rate), during the same contract term. If the consumer selects the reset rate initially, typically the consumer is earning a higher rate of interest on the consumer's premiums than that which is provided by the MYG rate but is also assuming a risk that the reset rate will decrease.

The insurer adjusts the reset rate at its discretion or based upon an external index. The insurer declares the reset rate in advance of its effective date and at any point in time, it may be lower than the MYG rate, which is applied on the day the annuity contract is issued. In the event the reset rate is lower than the MYG rate, the client has the option of electing that the MYG rate be applied, from that point forward, to the client's account balance. In another embodiment of the invention, the election may be made automatic such that once the reset rate falls below the MYG rate, no action on the client's part is required to change the interest rate to the guaranteed, MYG rate. The election of the MYG rate, subsequent to the election of the reset rate, is a one-time option and applies until the end of the contract term, regardless of whether the election is automatic or initiated by the client.

The present invention solves several of the problems associated with conventional administration of annuity products. It provides an annuity product, system, and method, which will reduce the risk of annuitants who elect to receive adjustable rates that can be reset periodically. Specifically, it provides an annuity product, system, and method containing a lock-in feature providing a guarantee that the adjustable interest rate payable to the client will not fall below a declared guaranteed interest rate, should the adjustable interest rate be significantly reset downwards. It also provides an annuity product, system, and method including this lock-in feature, as an option for the annuitant to exercise at will, or as an automatic feature elected upon issue of the annuity.

BRIEF DESCRIPTION OF DRAWINGS

The invention will be more fully understood and further advantages will become apparent when reference is had to the following detailed description of the preferred embodiments and the accompanying drawings, in which.

DESCRIPTION OF THE PREFERRED EMBODIMENTS

The present invention comprises a data processing system and method for administering an annuity product containing a lock-in interest rate feature. The system, method, and product provide the client with both the benefit of an adjustable interest rate, which reflects the movement of an external measure or insurer discretion, as well as a guaranteed interest rate. According to the invention, the lock-in feature insures that the interest rate payable to the client will not fall below a declared guaranteed interest rate, should the adjustable rate be significantly reset downwards. The client may select the lock-in as an automatic feature, elected upon issue of the annuity, or return the right to pick and choose, if and when, the guaranteed interest rate feature will be applied. The unique combination of these two capabilities makes the present invention a superior investment choice for clients, who wish to insure that their annuity accumulates enough to provide an adequate payout stream but at the same time, do not wish to absorb the significant risk that the interest rate they receive falls below a declared minimum level.

Figure 1:
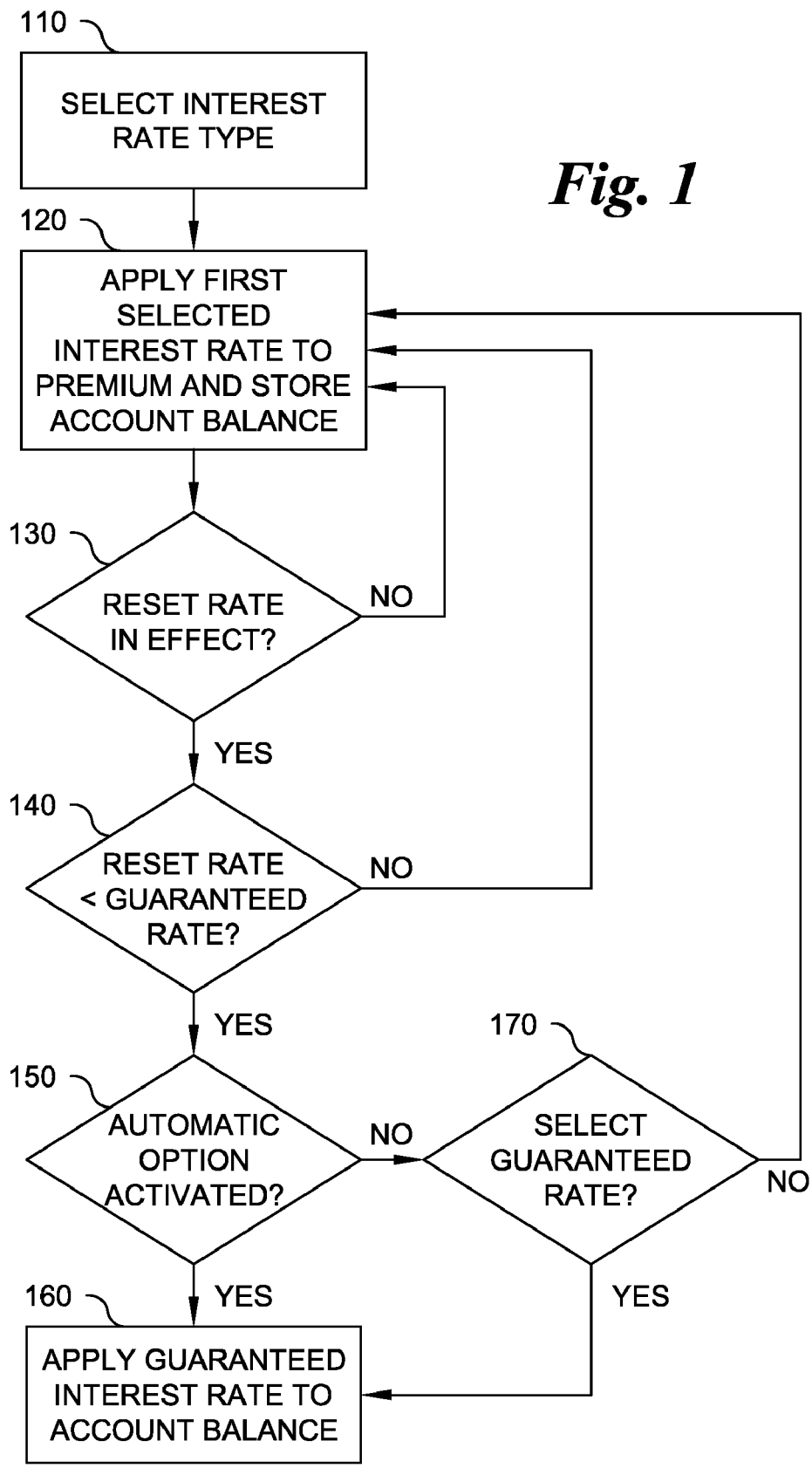
FIG. 1 is a flow chart illustrating a preferred embodiment of the present invention comprising a data processing method for administering an annuity product with a rate lock-in feature.

FIG. 1 is a flow chart illustrating a preferred embodiment of the present invention comprising a data processing method for administering an annuity product with an interest rate lock-in feature. It should be understood that the order of the successive method steps is shown for the sake of illustrating but one example and that the order of method steps can proceed in any variety of orders.

In step 110, the client selects the type of interest rate the client wishes to be applied to the client's premiums, during the accumulation phase of the fixed rate annuity. If the client wishes to absorb no risk at all, the client selects a guaranteed interest rate (MYG rate) for the guaranteed period. Typically the guaranteed period is several years or more. In step 110, the client may also select to have an adjustable rate (reset rate) applied to the client's premiums during the accumulation phase. The insurer declares this rate periodically, typically annually. The rate declared may be higher, lower, or equal to the MYG rate and is typically based upon an external index; however, the insurer may use its own discretion in selecting the rate percent. The client may also select a third choice, unique to this product, to have the insurer automatically apply the reset rate to the client's premium, until such time as the reset rate falls below the MYG rate. Should this event occur, the client's accumulated account balance earns interest at the MYG rate, until the end of the contract term. This automatic transfer is a one-time event. In accordance with this third option, the reset rate is no longer available as an option for the client, once the client has transferred to the MYG rate. In an alternate embodiment, this automatic option is not available to the client and the client must manually request the transfer of funds and the application of the MYG rate for the remainder of the contract term.

In step 120, the insurer calculates the interest credits the client has accumulated at the end of each period, by multiplying the account value by the selected rate. The insurer adds the interest credits to the existing account value to generate a new accumulated account value. In step 130, periodically, the insurer checks to see whether the reset rate has been selected, if it has, the insurer proceeds with step 140. In step 140, the insurer compares the reset rate with the MYG rate to see if the reset rate is the lower of the two rates. If not, the insurer applies the rate selected, i.e. the reset rate. If the reset rate is now lower than the MYG rate, the insurer proceeds to step 150.

In step 150, the insurer checks to see whether the client has selected the automatic option. If yes, the insurer applies the MYG rate to the client's premium and the account balance is earmarked for application of the MYG rate for the remainder of the contract term. If the client has not selected the automatic option, the insurer proceeds to step 170. In step 170, the client has the option of continuing to have the reset rate applied to the client's premium and account balance or changing to the MYG rate. If the client decides to select the MYG rate, this is a one-time only change, which will be applied to the client's account balance for the remainder of the contract term.

Figure 2:
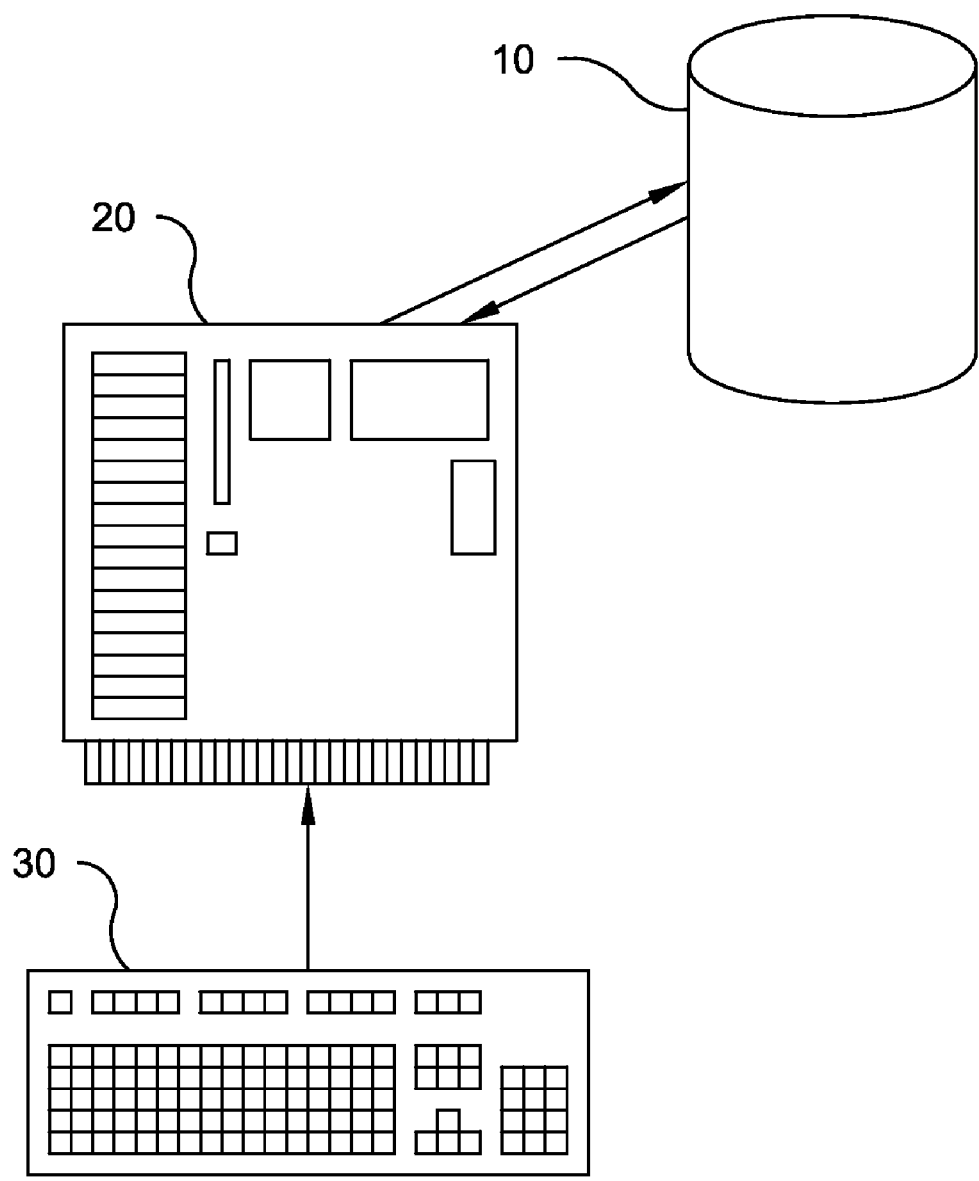
FIG. 2 is a diagram of a system for administering a preferred embodiment of the present invention.

FIG. 2 is a diagram of a system for administering the present invention. The software for implementing the method and product resides on a computer 20. The data including the account value of each client, the type of interest rate selected, the MYG, interest credits earned, date of each rate adjustment (anniversary), as well as additional client information is stored in permanent storage 10. This may take the form of tape, disk, flash memory and other well-known forms of digital storage. A keyboard 30 is used to input changes to the system 20, such as when the client selects a new form of interest rate. However, any standard input tool such as a mouse, card reader, wireless signal, etc. can be used with the system 20.

Table 1, set forth below, further illustrates how the lock-in feature would work in accordance with the present invention, when applied to a 7-year, fixed annuity, issued in this instance on Dec. $31^{st}$, 2006.

TABLE 1

| Anniversary | Annual Reset Bucket | Guaranteed Bucket | Account Value | Annual Reset Rate | MYG Rate | Interest Credits |
|---|---|---|---|---|---|---|
| Dec. 31, 2006 | 100,000 | — | 100,000 | 4.2% | 4.0% | |
| Dec. 31, 2007 | 104,200 | — | 104,200 | 4.4% | 4.0% | 4,200 |
| Dec. 31, 2008 | 108,785 | — | 108,785 | 4.6% | 4.0% | 4,585 |
| Dec. 31, 2009 | 113,789 | — | 113,789 | 4.8% | 4.0% | 5,004 |
| Dec. 31, 2010 | 119,251 | — | 119,251 | 4.5% | 4.0% | 5,462 |
| Dec. 31, 2011 | 124,617 | — | 124,617 | 3.0% | 4.0% | |
| | | "Lock-In" | | | | |
| Dec. 31, 2011 | — | 124,617 | 124,617 | 3.0% | 4.0% | 5,366 |
| Dec. 31, 2012 | — | 129,602 | 129,602 | 5.0% | 4.0% | 4,985 |
| Dec. 31, 2013 | — | 134,786 | 134,786 | | | 5,184 |

The system deposits client funds in the annual reset bucket to earn the initial rate (reset rate) of 4.2% as of Dec. $31^{st}$, 2006. At this point in time, the reset rate of 4.2% exceeds the MYG rate. On the first anniversary, Dec. 31, 2007, the reset rate rises to 4.4% while the MYG rate remains static at 4.0%. The client, at this point, has earned 4,200 interest credits generated by multiplying the reset rate of 4.2% by the account value of $100,000. The interest credits, or 4,200, are added to the amount in the annual reset bucket ($100,000), yielding $104,200, the account value as of Dec. 31, 2007.

On the second anniversary, Dec. 31, 2008, the reset rate is raised, once again, to 4.6%. By this time, 4,585 interest credits have been earned by multiplying 4.4%, the year 2007 interest rate, by the year 2007 account balance of $104,200. The interest credits are added to the account value yielding an account value of $108,785 as of Dec. 31, 2008. This process is repeated in years 2008, 2009, and 2010.

In year 2011, the lock-in feature of the present invention takes effect. As of Dec. 31, 2011, the reset rate falls to 3.0%, which is lower than the MYG rate of 4.0%. At this point, if the automatic option has been selected by the client, or if the client manually elects the lock-in option, the client's interest rate switches to the MYG. rate Accordingly, for the following year, year 2012, the interest applied is not the reset rate of 3.0% but rather, the MYG rate of 4.0%. Instead of earning $3,739, which would correspond to an interest rate of 3.0%, the account value earns $5,366, which corresponds to an interest rate of 4.0%. Furthermore, the account value from this date forward until the end of the contract, in this case year 7, earns interest credits corresponding to the credits earned using the MYG rate as a multiplier.

The detailed illustrative embodiment here presented is directed at providing a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

What is claimed is:

1. A system for administering a deferred annuity product, during the accumulation phase, comprising:

a receiver for receiving information regarding issuing said deferred annuity product, for receiving information regarding selecting a reset interest rate, for receiving information regarding selecting a guaranteed interest rate, and for receiving information regarding whether to adjust said reset interest rate during said accumulation phase, wherein said deferred annuity product has a predefined term and an account value, and further wherein said information is transmitted from a transmitter of or associated with an annuitant; and a processing module for determining said reset interest rate, for determining said guaranteed rate, and for determining whether to adjust said reset interest rate at predetermined time interval or intervals, wherein said determination to adjust said reset interest rate is chosen by said annuitant, and further wherein said processing module is at or associated with a provider of said deferred annuity product, wherein said system determines whether said annuity product is issued at said reset interest rate, and further wherein said system determines whether said reset interest rate is below said guaranteed interest rate at said predetermined time interval or intervals if said annuity product is issued with said reset interest rate, and wherein said system converts said reset interest rate to said guaranteed interest rate after said system determines that said reset interest rate is below said guaranteed interest rate and also determines that adjusting said reset interest rate is selected by said annuitant, and further wherein said system locks said deferred annuity product at said guaranteed interest rate for the remainder of said predefined term.

2. The system of claim 1, wherein said system automatically adjusts the reset interest rate to said guaranteed interest rate, wherein said reset interest rate is automatically adjusted to said guaranteed rate if a reset option having an automatic reset feature is selected with said deferred annuity product, wherein said reset option authorizes said system to automatically adjust said reset interest rate without annuitant input.

3. The system of claim 1, wherein said system adjusts said reset interest rate to said guaranteed rate if authorized by said annuitant, wherein said reset interest rate is adjusted if a reset option authorized said system to adjust said reset interest rate only with annuitant authorization.

4. The system of claim 3, wherein said reset interest rate is adjusted only during said accumulation phase.

5. The system of claim 1, wherein the system permits the annuitant to select successively the reset interest rate and the guaranteed interest rate for multiple years, during the accumulation phase.

\* \* \* \* \*